US010406557B2

(12) United States Patent
Xiong et al.

(10) Patent No.: US 10,406,557 B2
(45) Date of Patent: Sep. 10, 2019

(54) CURING APPARATUS AND CURING METHOD

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Li Xiong, Beijing (CN); Zhong Lu, Beijing (CN); Wenxuan Zhang, Beijing (CN); Zhenrui Fan, Beijing (CN); Yu Zhang, Beijing (CN); Yu Zhang, Beijing (CN); Yuanjiang Yang, Beijing (CN); Donghua Jiang, Beijing (CN); Byung Chun Lee, Beijing (CN); Shengzhou Gao, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 444 days.

(21) Appl. No.: 15/157,979

(22) Filed: May 18, 2016

(65) Prior Publication Data

US 2017/0087587 A1 Mar. 30, 2017

(30) Foreign Application Priority Data

Sep. 24, 2015 (CN) .......................... 2015 1 0617156

(51) Int. Cl.
*B05D 3/02* (2006.01)
*F26B 21/14* (2006.01)
*C09J 179/08* (2006.01)

(52) U.S. Cl.
CPC ............ *B05D 3/0272* (2013.01); *F26B 21/14* (2013.01); *B05D 2203/35* (2013.01); *B05D 2505/50* (2013.01)

(58) Field of Classification Search
CPC ....... B05D 3/0272; B05D 2505/50; C08J 5/18
(Continued)

(56) References Cited

U.S. PATENT DOCUMENTS 6,673,155 B2 * 1/2004 Nagashima ....... H01L 21/67109 118/64
2015/0323249 A1 11/2015 Wang et al.

FOREIGN PATENT DOCUMENTS

CN 103008203 A 4/2013
CN 103278966 A 9/2013
(Continued)

OTHER PUBLICATIONS

Online translation of CN 103707451A; publication date: Apr. 9, 2014.*

(Continued)

*Primary Examiner* — Fred M Teskin
(74) *Attorney, Agent, or Firm* — Ladas & Parry LLP

(57) ABSTRACT

A curing apparatus and a curing method are provided. The curing apparatus comprises: a chamber, configured for accommodating a substrate provided with a polyimide adhesive; an air extracting unit, configured for evacuating the chamber; and a heating unit, configured for performing a first heating on the substrate in the case that a first predetermined pressure is reached in the chamber during a evacuating process of the air extracting unit so as to remove organic gases from the polyimide adhesive, and performing a second heating on the substrate after the first heating so as to cure the polyimide adhesive.

17 Claims, 3 Drawing Sheets

(58) Field of Classification Search
USPC .................................................. 427/350, 379
See application file for complete search history.

(56) References Cited

FOREIGN PATENT DOCUMENTS

| | | | |
|---|---|---|---|
| CN | 103707451 | A | 4/2014 |
| CN | 103730331 | A | 4/2014 |
| CN | 103949386 | A | 7/2014 |
| JP | 2014-199806 | A | 10/2014 |

OTHER PUBLICATIONS

The First Chinese Office Action dated Apr. 18, 2017, Appln. No. 201510617156.9.
The Second Chinese Office Action dated Sep. 21, 2017; Appln. No. 201510617156.9.

* cited by examiner

CURING APPARATUS AND CURING METHOD

TECHNICAL FIELD

Embodiments of the present disclosure relate to a curing apparatus and a curing method.

BACKGROUND

Flexible display is an important development direction of a next-generation display technology, and the Flexible display has characteristics such as good flexibility, no fragility, small thickness, small weight, low power consumption, good portability and so on, and has wide application prospect in these fields such as e-book, mobile communication, laptop computer, television, public information and so on.

A flexible substrate made of a PI (polyimide) adhesive for example is used as a base substrate for fabricating a flexible display device. A method for preparing the flexible substrate by using the PI adhesive is as follows: coating the PI adhesive on a glass substrate, and then sending the glass substrate into a curing chamber to cure the PI adhesive. During the curing process, in order to prevent organic substances from being oxidized and discharge organic gases generated in the PI adhesive in time, it is necessary to continuously supply a large amount of N2. During the curing process described above, it is very easy to produce an eddy in corners of the curing chamber and the like places, so that the organic gases in such positions are hard to be discharged, and further easily condense into particles on the flexible substrate, which results in defects of the flexible substrate.

SUMMARY

According to embodiments of the disclosure, a curing apparatus is provided. The curing apparatus comprises: a chamber, configured for accommodating a substrate provided with a polyimide adhesive; an air extracting unit, configured for evacuating the chamber; and a heating unit, configured for performing a first heating on the substrate in the case that a first predetermined pressure is reached in the chamber during a evacuating process of the air extracting unit so as to remove organic gases from the polyimide adhesive, and performing a second heating on the substrate after the first heating so as to cure the polyimide adhesive.

For example, the curing apparatus further comprises an air supplying unit, configured for supplying nitrogen to the chamber after the first heating and before the second heating, so that a second predetermined pressure is reached in the chamber.

For example, the second predetermined pressure is greater than the first predetermined pressure.

For example, the first predetermined pressure is 20 Pa to 30 Pa, and the second predetermined pressure is 1000 Pa to 2000 Pa.

For example, the curing apparatus further comprises a cooling unit, configured for cooling the substrate after the second heating.

For example, the cooling unit cools the substrate by circulating nitrogen in the chamber.

For example, the chamber includes an opening for placing and taking out the substrate and a shutting member for opening and closing the opening.

For example, the curing apparatus further comprises an air cylinder, wherein the shutting member opens and closes the opening under a control of the air cylinder.

For example, a sealing ring is provided on a periphery of the opening or the shutting member.

For example, the curing apparatus comprises the plurality of chambers in a stacked arrangement, each of the chambers configured for accommodating one substrate.

For example, the curing apparatus comprises a plurality of air extracting units, each of the chambers being connected with one air extracting unit.

For example, the curing apparatus further comprises a cooling unit, configured for cooling the substrate after the second heating.

For example, the cooling unit cools the substrate by circulating nitrogen in the plurality of chambers or circulating the nitrogen in each chamber.

For example, a temperature of the first heating is 200° C. to 300° C., and a temperature of the second heating is 400° C. to 500° C.

For example, the chamber is provided with an exhaust unit, and the exhaust unit is connected with the air extracting unit.

For example, the exhaust includes a plurality of exhausting pipes and a connecting part for connecting the plurality of exhausting pipes, a plurality of pores are distributed on each exhausting pipe, and the air extracting unit is connected with the connecting part.

According to the embodiments of the disclosure, a curing method is provided. The method comprises: placing a substrate provided with a polyimide adhesive into a chamber; evacuating the chamber; performing a first heating on the substrate in the case that a first predetermined pressure is reached in the chamber in the process of evacuating the chamber, to remove organic gases from the polyimide adhesive; and performing a second heating on the substrate, to cure the polyimide adhesive.

For example, after the first heating and before the second heating, the method further comprises: supplying nitrogen to the chamber, so that a second predetermined pressure is reached in the chamber.

For example, after the second heating, the method further comprises: cooling the substrate.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Embodiments of the present disclosure provide a curing apparatus, and the curing apparatus comprises: a chamber, configured for accommodating a substrate provided with a polyimide (PI) adhesive; an air extracting unit, configured for evacuating the chamber; a heating unit, configured for performing a first heating on the substrate in the case that a first predetermined pressure is reached in the chamber during a evacuating process of the air extracting unit so as to remove organic gases from the PI adhesive, and performing a second heating on the substrate after the first heating so as to cure the PI adhesive.

In the curing apparatus according to the embodiments of the present disclosure, the process of removing organic gases from the PI adhesive is performed during evacuating the chamber by the air extracting unit, so that the organic gases can be discharged effectively. In this way, not only a possibility of the organic gases being condensed into particles can be effectively reduced, but also process time required for discharging the organic gases can be reduced, and a production cost can be greatly reduced for it is not necessary to continuously supply the nitrogen.

Figure 1:
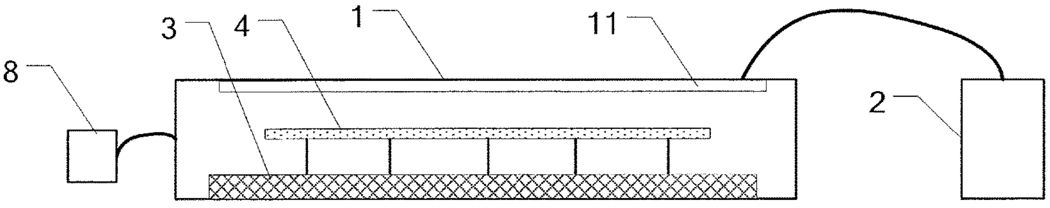
FIG. 1 is a schematic view illustrating a curing apparatus according to embodiments of the present disclosure.

FIG. 1 is a schematic view illustrating the curing apparatus according to the embodiments of the present disclosure. Referring to FIG. 1, the curing apparatus comprises: the chamber 1, configured for accommodating the substrate 4 provided with the polyimide (PI) adhesive and provided with an exhaust unit 11; an air extracting unit 2, connected with the exhaust unit 11 and configured for evacuating the chamber 1; and the heating unit 3, provided in the chamber 1, and configured for performing the first heating on the substrate in the case that the first predetermined pressure is reached in the chamber during the process of evacuating the chamber by the air extracting unit 2 so as to remove the organic gases from the PI adhesive and performing the second heating on the substrate after the first heating so as to cure the PI adhesive. For example, a temperature of the first heating is 200° C. to 300° C.; for example, the temperature of the first heating is 220° C., 250° C. and 280° C., etc. For example, a temperature of the second heating is 400° C. to 500° C.; for example, the temperature of the second is heating 420° C., etc.

For example, the air extracting unit 2 is a vacuum pump. For example, the heating unit 3 is a heater of resistance type.

For example, the exhaust unit 11 is arranged on a top portion of the chamber 1.

Figure 2:
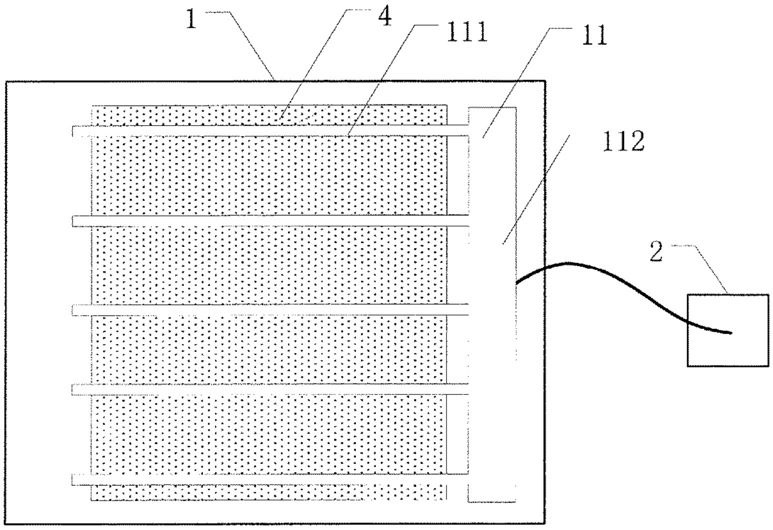
FIG. 2 is a top view of the curing apparatus in FIG. 1.

FIG. 2 is a top view of the curing apparatus in FIG. 1. As shown in FIG. 2, the exhaust unit 11 includes a plurality of exhausting pipes parallel to each other and a connecting part 112 for connecting the plurality of exhausting pipes, a plurality of pores are uniformly distributed on each exhausting pipe, and the air extracting unit 2 is connected with the connecting part 112. In this way, respective positions in the chamber are uniformly evacuated.

Figure 3:
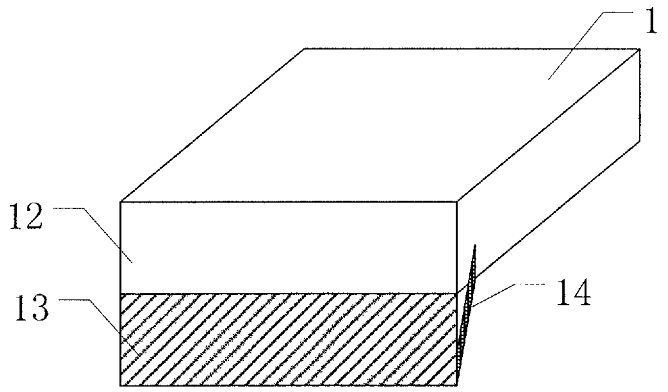
FIG. 3 is a schematic view illustrating a chamber of the curing apparatus according to embodiments of the present disclosure.
Figure 4:
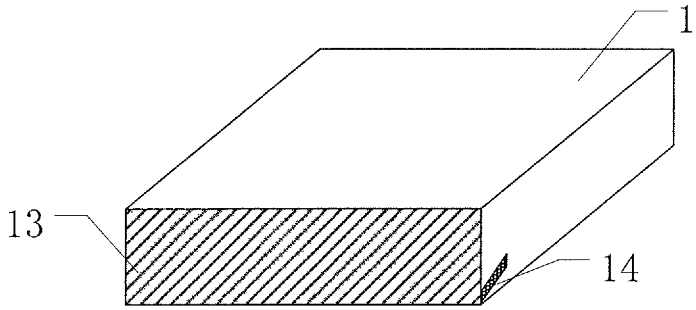
FIG. 4 is a schematic view illustrating that an opening of the chamber in FIG. 3 is closed.

A structure of the chamber 1 for example is shown in FIG. 3. As shown in FIG. 3, the chamber 1 includes an opening 12 for placing and taking out the substrate and a shutting member 13 for opening and closing the opening 12, and the shutting member 13 opens or closes the opening 12 under a control of an air cylinder 14. The closed chamber is as shown in FIG. 4. For example, in order to improve tightness of the chamber, a sealing ring is provided on a periphery of the opening 12 or the shutting member 13.

For example, after the substrate 4 is placed in the chamber, the chamber is evacuated by the air extracting unit 2; in the case that the first predetermined pressure is reached in the chamber, the heating unit 3 performs the first heating on the substrate, so that the PI adhesive generates organic gases; in the process of performing the first heating, the chamber is continuously evacuated by the air extracting unit, so that the pressure in the chamber is kept and finally the organic gases anywhere in the chamber are discharged in time.

After the predetermined time, the organic gases in the PI adhesive are removed from the PI adhesive by the first heating. And then, the air extracting unit 2 stops evacuating the chamber; meanwhile, the heating unit continuously heats the substrate to perform the second heating to cure the PI adhesive.

For example, the curing apparatus in the embodiments of the present disclosure further comprises an air supplying unit 8, which is configured for supplying nitrogen to the chamber after the first heating and before the second heating, so that the second predetermined pressure is reached in the chamber; and the second predetermined pressure is greater than the first predetermined pressure. The nitrogen is supplied into the chamber by the air supplying unit 8 to serve as a transmitting medium of thermal energy, and thus it is easily to transmit the thermal energy to the substrate and cure the PI adhesive provided on the substrate. For example, the first predetermined pressure is 20 Pa to 30 Pa; for example, the first predetermined pressure is 22 Pa, 25 Pa, 28 Pa and so on. For example, the second predetermined pressure is 1000 Pa to 2000 Pa; for example, the second predetermined pressure is 1300 Pa, 1500 Pa, 1800 Pa and so on. For example, an air inlet is arranged on a side wall of the chamber, and the air supplying unit 8 supplies the nitrogen to the chamber through the air inlet, so that the pressure in the chamber is kept in the range of 1000 Pa to 2000 Pa.

For example, in order to further shortening the process time, the curing apparatus in the embodiments of the present disclosure further comprises a cooling unit, which is configured for cooling the substrate after the second heating.

Figure 5:
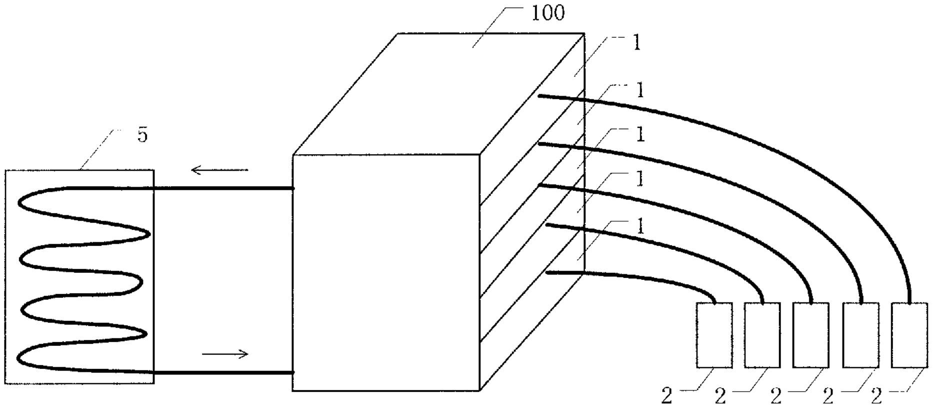
FIG. 5 is a schematic view illustrating a modification of the curing apparatus according to the embodiments of the present disclosure.

Referring to FIG. 5, FIG. 5 is a modification of the curing apparatus according to the embodiments of the present disclosure. The curing apparatus comprises a heating furnace 100, an air extracting unit 2 and a cooling device 5.

Figure 6:
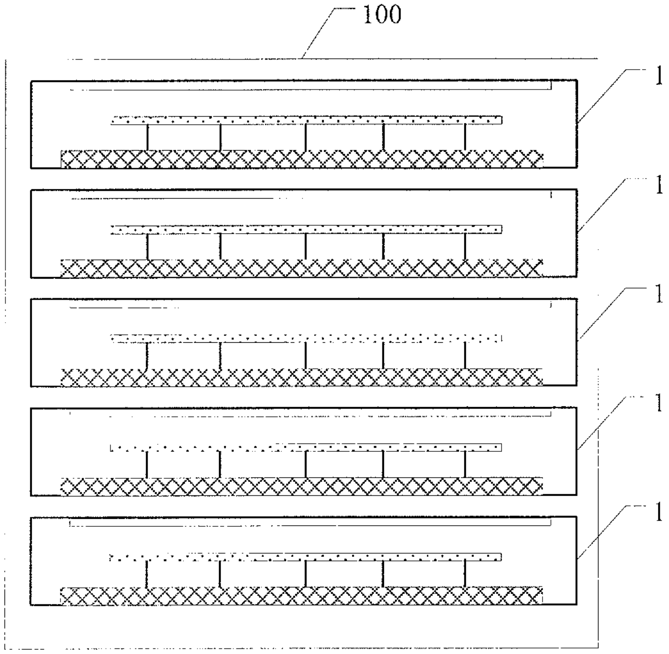
FIG. 6 is a lateral view illustrating a heating furnace of the curing apparatus in FIG. 5.

A lateral view of the heating furnace 100 is shown in FIG. 6. As shown in FIG. 6, a plurality of chambers 1 shown in FIG. 1 are arranged in the heating furnace 100; the plurality of chambers are in a stacked arrangement, each of the chambers is used for accommodating one substrate, and each of the chambers is connected with one air extracting unit 2.

A cooling unit 5 is configured for cooling the substrate after the PI is cured. For example, the cooling unit 5 cools the substrate in a manner of circulating the nitrogen in the whole heating furnace or in a manner of circulating the nitrogen in each chamber, so that the pressure in the chamber is same as an external environment pressure. After the substrate is cooled, the opening of the chamber is opened, so as to take out the substrate.

The curing apparatus according to the embodiments of the present disclosure for example is applied to fabricate a flexible substrate. In the process of curing the PI adhesive, the process of removing the organic gases from the PI adhesive is performed during evacuating the chamber by the air extracting unit, so that the organic gases are discharged effectively, a possibility of the organic gases being condensed into particles is effectively reduced, and finally the quality of the PI adhesive is improved. The process of removing the organic gases from the PI adhesive is performed during evacuating the chamber by the air extracting unit, so that process time required for discharging the organic gases is reduced, and a production cost is greatly reduced for it is not necessary to continuously supply the nitrogen.

After curing the PI adhesive, the cured PI adhesive for example is used as a base substrate for fabricating a flexible display device, and the components (e.g., OLED) of the flexible display device are formed on the base substrate. As described above, since the quality of the cured PI adhesive is improved, the performance of the flexible display device is improved accordingly.

The embodiments of the present disclosure further provide a curing method, which comprises: placing a substrate provided with a polyimide (PI) adhesive into a chamber; evacuating the chamber; performing a first heating on the substrate in the case that a first predetermined pressure is reached in the chamber in the process of evacuating the chamber, to remove organic gases from the PI adhesive; and performing a second heating on the substrate, to cure the PI adhesive.

The chamber is evacuated at the time of the first heating, and the chamber is not evacuated at the time of the second heating.

For example, after the first heating and before the second heating, the method further comprises: supplying nitrogen to the chamber, so that a second predetermined pressure is reached in the chamber. For example, the first predetermined pressure is 20 Pa to 30 Pa; for example, the first predetermined pressure is 22 Pa, 25 Pa, 28 Pa and so on. For example, the second predetermined pressure is 1000 Pa to 2000 Pa; for example, the second predetermined pressure is 1300 Pa, 1500 Pa, 1800 Pa and so on.

For example, after the second heating, the method further comprises: cooling the substrate. For example, cooling is performed in a manner of circulating the nitrogen.

The foregoing embodiments merely are exemplary embodiments of the present disclosure, and not intended to define the scope of the present disclosure, and the scope of the present disclosure is determined by the appended claims.

The present application claims priority of Chinese Patent Application No. 201510617156.9 filed on Sep. 24, 2015, the present disclosure of which is incorporated herein by reference in its entirety as part of the present application.

The invention claimed is:

1. A curing apparatus, comprising:

a chamber, configured for accommodating a substrate provided with a polyimide adhesive;

an air extracting unit, configured for evacuating the chamber; and a heating unit, configured for performing a first heating on the substrate in the case that a first predetermined pressure is reached in the chamber during an evacuating process of the air extracting unit so as to remove organic gases from the polyimide adhesive, and performing a second heating on the substrate after the first heating so as to cure the polyimide adhesive, wherein, the chamber is provided with an exhaust unit, and the exhaust unit is connected with the air extracting unit, the exhaust unit includes a plurality of exhausting pipes and a connecting part for connecting the plurality of exhausting pipes, a plurality of pores are distributed on each exhausting pipe, and the air extracting unit is connected with the connecting part.

2. The curing apparatus according to claim 1, further comprising an air supplying unit, configured for supplying nitrogen to the chamber after the first heating and before the second heating, so that a second predetermined pressure is reached in the chamber.

3. The curing apparatus according to claim 2, wherein the second predetermined pressure is greater than the first predetermined pressure.

4. The curing apparatus according to claim 3, wherein, the first predetermined pressure is 20 Pa to 30 Pa, and the second predetermined pressure is 1000 Pa to 2000 Pa.

5. The curing apparatus according to claim 1, further comprising a cooling unit, configured for cooling the substrate after the second heating.

6. The curing apparatus according to claim 5, wherein, the cooling unit cools the substrate by circulating nitrogen in the chamber.

7. The curing apparatus according to claim 1, wherein, the chamber includes an opening for placing and taking out the substrate and a shutting member for opening and closing the opening.

8. The curing apparatus according to claim 7, further comprising an air cylinder, wherein the shutting member opens and closes the opening under a control of the air cylinder.

9. The curing apparatus according to claim 7, wherein, a sealing ring is provided on a periphery of the opening or the shutting member.

10. The curing apparatus according to claim 1, comprising a plurality of chambers in a stacked arrangement, each of the chambers configured for accommodating one substrate.

11. The curing apparatus according to claim 10, comprising a plurality of air extracting units, each of the chambers being connected with one air extracting unit.

12. The curing apparatus according to claim 10, further comprising a cooling unit, configured for cooling the substrates after the second heating.

13. The curing apparatus according to claim 12, wherein, the cooling unit cools the substrates by circulating nitrogen in the plurality of chambers or circulating the nitrogen in each chamber.

14. The curing apparatus according to claim 1, wherein, a temperature of the first heating is 200° C. to 300° C., and a temperature of the second heating is 400° C. to 500° C.

15. A curing method, comprising:

placing a substrate provided with a polyimide adhesive into a chamber;

evacuating the chamber with an air extracting unit;

performing a first heating on the substrate in the case that a first predetermined pressure is reached in the chamber in the process of evacuating the chamber, to remove organic gases from the polyimide adhesive; and performing a second heating on the substrate, to cure the polyimide adhesive, wherein, the chamber is provided with an exhaust unit, and the exhaust unit is connected with the air extracting unit, the exhaust unit includes a plurality of exhausting pipes and a connecting part for connecting the plurality of exhausting pipes, a plurality of pores are distributed on each exhausting pipe, and the air extracting unit is connected with the connecting part.

16. The curing method according to claim 15, wherein, after the first heating and before the second heating, the method further comprises:

supplying nitrogen to the chamber, so that a second predetermined pressure is reached in the chamber.

17. The curing method according to claim 15, wherein, after the second heating, the method further comprises: cooling the substrate.

* * * * *